Sept. 21, 1954   F. H. VAN BRIESEN   2,689,600
PORTABLE ARMREST FOR AUTOMOBILE SEATS
Filed July 28, 1953   2 Sheets-Sheet 2
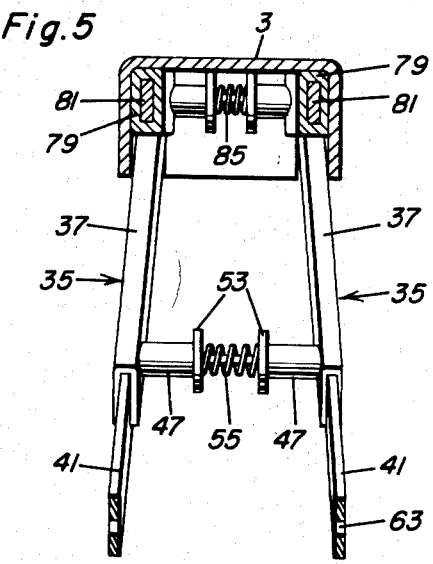
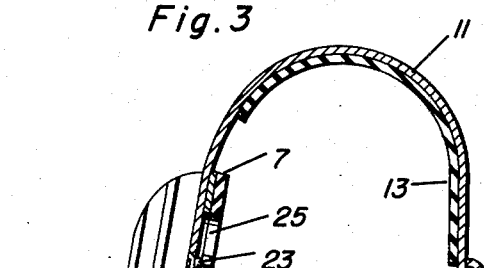
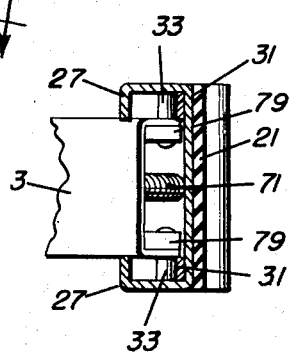
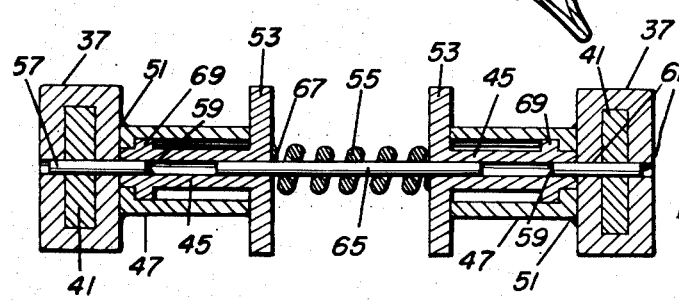
Fritz H. Van Briesen
INVENTOR.

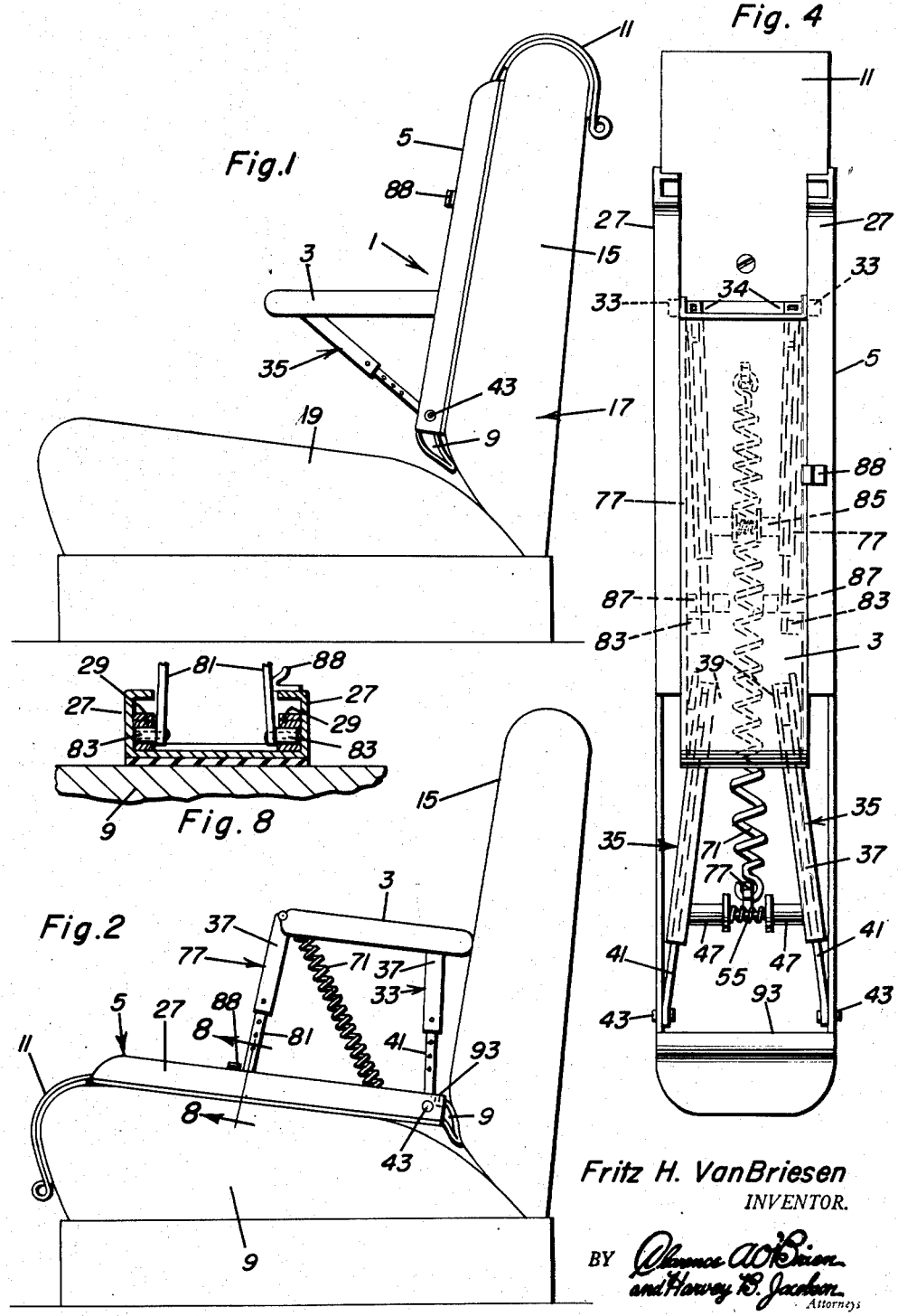

Patented Sept. 21, 1954

2,689,600

UNITED STATES PATENT OFFICE 2,689,600

PORTABLE ARMREST FOR AUTOMOBILE SEATS

Fritz H. Van Briesen, George, Iowa

Application July 28, 1953, Serial No. 370,667

7 Claims. (Cl. 155—112)

My invention relates to improvements in portable foldable arm rests for automobile and similar seats.

The primary object of my invention is to provide a portable arm rest attachable to the back of a seat in suspended position, or to the seat cushion for support thereon.

Another object is to provide an arm rest which is attachable as above set forth and foldable into compact form when not in use.

Still another object is to provide an arm rest for accomplishing the above which is simple in construction, safe, will not mar or otherwise damage the seat covering, and is comparatively inexpensive to manufacture.

To the accomplishment of the above, and other objects presently appearing, my invention provides an attaching bar with means thereon for attaching the same in suspended position to the back of a seat, or to the front edge of the seat to rest in substantially horizontal position thereon, an arm support, and means to connect the support to the bar in substantially horizontal position crosswise of the seat cushion in either position of the bar and providing for folding of the support substantially parallel with and close to the bar, all as illustrated in the accompanying drawings, set forth in detail in the succeeding description, and defined in the claims appended hereto.

In said drawings:

Figure 1 is a view in side elevation illustrating my improved arm rest in the preferred embodiment thereof attached to the back of a seat;

Figure 2 is a similar view illustrating the arm rest attached to the seat cushion for support thereon;

Figure 3 is an enlarged view in vertical longitudinal section illustrating the support connected to the bar positioned for suspending on the back of the seat;

Figure 4 is a view in front elevation of the arm rest as shown in Figure 3 with the support folded;

Figure 5 is a fragmentary view in vertical transverse section taken on the line 5—5 of Figure 3 and enlarged;

Figure 6 is an enlarged detail view in longitudinal section taken on the line 6—6 of Figure 3;

Figure 7 is an enlarged fragmentary view in horizontal section taken on the line 7—7 of Figure 3; and Figure 8 is an enlarged fragmentary view in vertical section taken on the line 8—8 of Figure 2.

Referring to the drawings by numerals, my improved arm rest, designated generally by the numeral 1, comprises, as its basic component, an inverted, channel bar arm support 3, and an attaching bar 5 having an attaching end 7 and a free end 9. A resilient hook 11 internally padded, as at 13, and flat in cross-section, is connected at one end to the attaching end 7 of said bar 5 to extend rearwardly therefrom. The free end 9 of said bar 5 is bent rearwardly of said bar for a purpose presently seen.

The arm rest 1 is adapted to be suspended from the back 15 of an automobile seat 17 by engaging the hook 11 over the upper edge of the back 15 to suspend said bar 5 in front of and in engagement with said back 15, as shown in Figure 1. Optionally, the arm rest 1 is adapted to be supported on the seat cushion 19 by hooking said hook rearwardly over the front edge of the seat cushion 19 with the attaching bar 15 resting on said cushion in rearwardly extending position and with its free end fitted in the crease between the back 15 and said seat cushion 19, as shown in Figure 2. A suitable padding strip 21 is provided on the back of the attaching bar 5 to protect the seat covering.

A bolt and slot connection 23, 25 is provided between the hook 11 and the attaching bar 5 for adjustment of said hook longitudinally of said bar 5 to vertically adjust said bar 5 on the back 15, or to adjust said bar transversely of the seat cushion 19, according to the height of the back 15 and the width of the seat cushion 19.

When the arm rest 1 is suspended from the back 15, the arm support 3 is attached to the attaching bar 5 by the following means. The attaching bar 5 is provided with longitudinal side flanges 27 which are suitably formed to provide on the inner sides thereof longitudinal guide channels, as at 29, open at the attaching end 7 of the bar 5 and which terminate intermediate the ends of said bar 5 and open at the bottom of the channels into a series of longitudinally spaced notches 31 in said flanges 27.

A pair of side rollers 33 mounted on studs 34 on the rear end of the arm support 3 are adapted to be seated in selected notches 31 in the flanges 27 to support the rear end of the arm support 3 at different heights on the attaching bar 5. The rollers 33 may be entered in the selected notches 31 by passing the rollers along the channels 29 from the attaching end 7 of the attaching bar 5.

A pair of extensible supporting braces 35 for the front end of the arm support 3 extend downwardly and rearwardly from opposite sides of said support 3 to the flanges 27. The braces 35 comprise hollow female brace sections 37 pivoted at front ends thereof, as at 39, in the arm support adjacent the front end of the support, and male brace sections 41 slidable endwise out of the rear ends of the female sections 37 and pivoted at rear ends thereof, as at 43, to the flanges 27 adjacent the free end 9 of the attaching bar 5. As will be seen, the supporting braces 35 are telescopically adjustable to extend and contract the same. This provides for adjusting the arm support 3 into exact horizontal position, or into inclined position if desired, about the axis of the rollers 33 when the arm support is arranged at different heights on the attaching bar 5.

Locking means for holding the supporting braces 35 in adjusted positions comprises a pair of coaxial, tubular, locking plungers 45 between the female brace sections 37 slidably fitted in a pair of tubular bushings 47 extending endwise from the inner sides of the female brace sections 37 and suitably welded thereto, as at 51. Enlarged, confronting heads 53 on inner ends of the plungers 45 provide finger grips for sliding said plungers 45 towards each other simultaneously into unlocking position in opposition to a coil spring 55 interposed between the heads 53 and normally urging said plungers 45 apart into locking position.

A pair of coaxial locking pins 57 welded, as at 59, in outer ends of the plungers 45 are adapted to enter aligned openings 61 in the female brace sections 37 and selected longitudinally spaced openings 63 in the male brace sections 41 registering with said openings 63 in the different adjusted positions of the supporting braces 35.

A guide rod 65 welded in one plunger 45, as at 67, and extending through the spring 55 with one end slidable in the other plunger 45 guides said plungers in their sliding movement outwardly of the bushings 47, and supports the spring 55. Flanges 69 on said plungers 45 guide the plungers 45 inside the bushings 47. The sliding of the plungers 45 into unlocking position retracts the locking pins 57 into unlocking position in a manner which will be obvious.

A coil spring 71 is attached at one end, as at 73, to the arm support 3, forwardly of the rollers 33, with its other end attached, as at 75, to the attaching bar 5 below the support 3 to yieldingly hold the rollers 33 in the selected notches 31.

A pair of extensible supporting braces 77 for the arm support 3, like the described braces 35 with the exception presently noted, have the female brace sections 79 pivoted on the studs 34 at opposite sides of the arm support 3 at the rear ends thereof for swinging into and out of the support 3 into folded and unfolded positions, respectively. The male brace sections 81 are, in this instance, provided with terminal side rollers 83 on the outer ends thereof. Otherwise, the braces 77 are the same as the braces 35 and are provided with locking means 85 identical with the locking means for the braces 35 and for the same purpose. The supporting braces 77 are adapted to be latched in folded longitudinally extending position in the channel of the arm support 3 by a spring clip 87 on said support engaging with the male brace section 81 of each of the supporting braces 77. As will presently be clear, the supporting braces 77 are designed to support the rear end of the arm support 3 when the arm rest 1 is attached to the seat cushion 19.

When the arm rest 1 is suspended from the back 15 of the seat 17, as shown in Figure 1, and the arm support 3 is positioned in a substantially horizontal position with the supporting braces 35 supporting the front end of the arm support, said braces 77 are folded into the arm support 3 and latched, as described, and as shown in Figure 3. From that position, the arm support 3 and supporting braces 35 may be folded on the attaching bar 5 substantially parallel to said bar by manipulating the support 3 to move the rollers 33 out of the selected notches 31 into the guide channels 29 and along said channels toward the attaching end 7 of said bar 5 so that the arm support 3 will pivot on the rollers 33 and the pivots 39 and the supporting braces 35 will be swung on the pivots 43 until said arm support 3 and supporting braces 35 are substantially parallel with the attaching bar 5 and with the spring 71 stretched, all as shown in Figure 3. A clip 88 is provided on one of the flanges 27 for latching the arm support 3 in the desired folded position.

The arm rest 1 is unfoldable to convert the same for use on the seat cushion 19. When thus unfolded, the arm support 3 is substantially parallel with the attaching bar 5. To unfold and convert the arm rest 1, the arm support 3 is moved toward the attaching end 7 of the attaching bar 5 to run the rollers 33 out of the guideways 29, this movement being in opposition to the spring 71, and performed with the supporting braces 35 unlocked for suitable extension. The supporting braces 77 are then unfolded, or swung out of the arm support 3 unlocked and suitably extended and the rollers 83 entered in the channels 23 from the attaching end 7 of the attaching bar 5 and run along said channels and seated in a pair of special notches 91 in the flanges 27 spaced from the series of notches 31 and into which the channels 29 open at the bottoms thereof. This arranges the supporting braces 35, 37 in substantially right angled position relative to the attaching bar 5 to swing the arm support 3 away from the attaching bar for adjustment substantially parallel therewith by proper adjustment of the supporting braces 35, 37, all as shown in Figure 2. A stop 93 on the free end 9 of the attaching bar 5 engages one of the supporting braces 35 and limits such swinging of the arm support 3. In this unfolded position of the arm support 3 and the supporting braces 35, 77, the spring 71 assumes an inclined position and exerts pull on the arm support 3 downwardly to hold the rollers 83 in the notches 91 and to hold the brace 35 engaged with the stop so as to yieldingly hold the arm support 3 and supporting braces 35, 77 in the described unfolded position as also shown in Figure 2. The special notches 91 are oblique to the channels 29 to facilitate entering the rollers 83 therein.

When the arm support 3 is positioned as described in the preceding paragraph, substantially parallel with the attaching bar 5, it may be folded in between the flanges 27 by unlocking the braces 35 to permit the same to extend and then by swinging said support 3 and the supporting braces 35, 77 on the pivots 34, 43 toward the attaching bar 5. Of course, this operation is accomplished in opposition to the spring 71. The arm support 3 may then be locked in between the flanges 29 by means of the aforementioned clip 88.

The foregoing will, it is believed, suffice to impart a clear understanding of my invention, without further explanation.

Manifestly, the invention, as described, is susceptible of modification without departing from the inventive concept, and right is herein reserved to such modifications as fall within the scope of the appended claims.

Having described my invention, what is claimed as new is:

1. An arm rest for an automobile seat comprising an attaching bar, means on one end of the bar for attaching the same selectively to the back of the seat in upright position and to the seat cushion in horizontal position, an arm rest bar, and folding means for foldably connecting said arm rest bar to said attaching bar substantially horizontally in either position of said attaching bar.

2. An arm rest according to claim 1, said first named means comprising a resilient hook on one end of the attaching bar engageable over said back and over the front edge of the seat cushion.

3. An arm rest according to claim 1, said second named means comprising side rollers on one end of the supporting bar, side notches in said attaching bar in which said rollers are adapted to seat to support one end of said supporting bar, braces at opposite sides of said supporting bar having corresponding ends pivoted thereto at the other end of said supporting bar to support said end, the other ends of said braces being pivoted to said attaching bar for swinging of the braces substantially parallel to said attaching bar, said supporting bar being swingable on said braces substantially parallel to said attaching bar, and a pair of horizontal side channels in said attaching bar into which said rollers are movable out of the notches and rollable along said channels to compensate for swinging of said supporting bar on said braces.

4. An arm rest according to claim 3, and spring means opposing swinging of said supporting bar.

5. An arm rest according to claim 1, said second named means comprising, a pair of notches in opposite sides of said attaching bar, a pair of extensible braces at opposite sides of said supporting bar having rollers on corresponding ends thereof seating in said notches, a second pair of extensible braces at opposite sides of said supporting bar having corresponding ends pivoted to opposite sides of said attaching bar, said pairs of braces being swingable toward and from the attaching bar into and from folded position, said supporting bar being pivoted at its ends between the other ends of said pair of braces for swinging thereby toward and from said attaching bar into and from folded position, and a pair of longitudinal channels in opposite sides of said attaching bar open at one end of the same and opening into said notches and into which said rollers may be inserted and moved into said notches.

6. An arm rest according to claim 1, including braces for supporting said supporting arm on said attaching bar when said attaching bar is attached in horizontal position, and pivoted on said supporting arm for folding against the same when said supporting bar is connected to said attaching bar in the upright position of the attaching arm.

7. An arm rest according to claim 5, and a stop on said supporting arm limiting swinging of one brace from folded position.

References Cited in the file of this patent

UNITED STATES PATENTS

| Number | Name | Date |
|---|---|---|
| 1,252,192 | Stanford | Jan. 1, 1918 |
| 1,835,049 | Hottel | Dec. 8, 1931 |
| 2,256,944 | Fall | Sept. 23, 1941 |
| 2,587,302 | Fawcett | Feb. 26, 1952 |